US012710008B2

(12) United States Patent
Dahl et al.

(10) Patent No.: US 12,710,008 B2
(45) Date of Patent: Aug. 18, 2026

(54) METHOD AND SYSTEM FOR COMPRESSED AIR SUPPLY

(71) Applicant: Ford Global Technologies, LLC, Dearborn, MI (US)

(72) Inventors: Colby Dahl, Saline, MI (US); Douglas Martin, Canton, MI (US); Matthew Ryan Preston, Whitmore Lake, MI (US); John Rollinger, Troy, MI (US); Shriram Siravara, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 779 days.

(21) Appl. No.: 17/650,040

(22) Filed: Feb. 4, 2022

(65) Prior Publication Data

US 2023/0250752 A1 Aug. 10, 2023

(51) Int. Cl.
*F04B 35/00* (2006.01)
*F02B 63/06* (2006.01)

(52) U.S. Cl.
CPC ............ *F02B 63/06* (2013.01); *F04B 35/002* (2013.01); *F04B 35/008* (2013.01)

(58) Field of Classification Search
CPC ....... F02B 63/06; F04B 35/002; F04B 35/008
USPC .............................................................. 415/1
See application file for complete search history.

(56) References Cited

U.S. PATENT DOCUMENTS

| | | | | |
|---|---|---|---|---|
| 3,306,225 | A * | 2/1967 | Smith | F04C 15/0026 418/102 |
| 3,700,396 | A * | 10/1972 | Adams | F15B 21/08 91/461 |
| 4,348,863 | A * | 9/1982 | Taylor | B60K 6/12 60/415 |
| 4,629,405 | A * | 12/1986 | Hidasi | F04C 15/0088 418/206.1 |
| 5,880,957 | A * | 3/1999 | Aardema | G05B 19/0426 700/86 |
| 6,019,702 | A * | 2/2000 | Ehrenhardt | B60K 17/28 477/107 |
| 6,922,997 | B1 | 8/2005 | Larson et al. | |
| 8,668,042 | B2 * | 3/2014 | Elliott | F16H 61/46 180/339 |
| 9,688,260 | B2 | 6/2017 | Aixala et al. | |

(Continued)

FOREIGN PATENT DOCUMENTS

JP 2000186667 A * 7/2000 ............. F04B 27/00

OTHER PUBLICATIONS

Martin, D. et al., "Methods and System for Stopping an Internal Combustion Engine," U.S. Appl. No. 17/180,569, filed Feb. 19, 2021, 34 pages.

(Continued)

*Primary Examiner* — Kurt Philip Liethen
*Assistant Examiner* — Anthony Donald Taylor, Jr.
(74) *Attorney, Agent, or Firm* — McCoy Russell LLP

(57) ABSTRACT

Methods and systems to provide compressed air to one or more air consumers external to the engine using transmission fluid from a transmission pump are presented. In one example, the transmission fluid may be routed to drive an air compression system including two cylinders. The air compressed at the compression system may be stored in a tank and/or provided to the one or more air consumers.

19 Claims, 5 Drawing Sheets

(56) References Cited

U.S. PATENT DOCUMENTS

| | | | | |
|---|---|---|---|---|
| 2001/0056544 | A1* | 12/2001 | Walker | B60R 25/102<br>180/170 |
| 2004/0163613 | A1 | 8/2004 | Bystedt et al. | |
| 2009/0133395 | A1 | 5/2009 | Hilberer | |
| 2012/0023991 | A1* | 2/2012 | Czechowski | B60C 23/10<br>152/415 |
| 2014/0356212 | A1* | 12/2014 | Barth | F04B 49/103<br>418/164 |
| 2019/0154023 | A1* | 5/2019 | Oroojloo | F04B 39/08 |

OTHER PUBLICATIONS

Dahl, C. et al., "Method and System for an on Board Compressor," U.S. Appl. No. 17/645,255, filed Dec. 20, 2021, 28 pages.

Dahl, C. et al., "Method and System for Compressed Air Supply," U.S. Appl. No. 17/650,042, filed Feb. 4, 2022, 36 pages.

* cited by examiner

METHOD AND SYSTEM FOR COMPRESSED AIR SUPPLY

FIELD

The present application relates to methods and systems for generating and supplying compressed air aboard a vehicle that includes a transmission system.

BACKGROUND/SUMMARY

Compressed air may be a preferred form of energy for operation of certain external devices coupled to a vehicle. For example, in building trades, compressed air may be applied to operate nail guns, staplers, paint sprayers, chippers, and air hammers. The compressed air may be more suitable for operating tools in wet environments, hot environments, and environments where there may be large amounts of dust. Air operated tools may have advantages including being lighter, lower in cost, and having a greater power to weight ratio as compared to electrically operated tools. However, towing a compressor to a job site may be inconvenient and some compressors may be electrically powered. Thus, an electric power source may have to be brought with the compressor to operate the compressor. Consequently, some of the advantages of air operated tools may be reduced depending on resources that may be available at a job site and ancillary devices that may have to be leveraged to operate air powered tools. Compressed air may also be used to inflate vehicle tires to a desired pressure.

Attempts have been made to generate and supply compressed air to external devices. One example system and associated method is shown by Aixala et. al. in U.S. Pat. No. 9,688,260. Therein, engine torque is used to operate an air compressor and the compressed air is stored in a tank. The rate of compressed air generated may be adjusted based on engine operation.

However, the inventors herein have recognized potential issues with using engine torque to generate compressed air. As one example, by using a portion of the engine torque generated to drive an air compressor, the parasitic loss of engine power may be increased. During higher engine torque demand, supplying engine torque for compressed air generation may cause loss of desired engine power and deteriorate driving experience.

In one example, the issues described above may be addressed by a method for a vehicle, comprising: supplying transmission fluid from a transmission pump to drive an air compression system, and providing compressed air to one or more air consumers external to the engine. In this way, by selectively using a hydraulic transmission pump to generate compressed air, availability of compressed air may be ensured without an external energy source.

As one example, the engine may drive a hydraulic transmission pump. A portion of transmission fluid from the pump may be routed to a hydraulic cylinder including a first piston of an air compression system. The first piston of the hydraulic cylinder may be connected to a second piston of a pneumatic cylinder. Due to the movement of the first piston, air may be drawn in and compressed at the pneumatic cylinder. In response to a request for compressed air such as during operation of an air powered tool with a pressure of compressed air in the tank being lower than a first threshold level, a control valve may be actuated to cycle delivery of transmission fluid between two sides of the hydraulic cylinder. As the fluid cycles through two sides of the hydraulic cylinder, the first piston cycles the second piston and causes air that may enter the pneumatic cylinder via two air inlets to compress. The compressed air from the pneumatic cylinder may then be directed to the tank or directly supplied to the air powered tool. In response to the pressure of compressed air in the tank increasing to a second threshold level, the generation of the compressed air at the pneumatic cylinder may be discontinued and cycling of the control valve may be suspended.

In this way, by applying energy from transmission fluid to generate compressed air, it may be possible to provide compressed air without towing a compressor or using an electric power source to drive a compressor. Further, the approach may be integrated into a vehicle to allow convenient operation of air powered devices. The technical effect of only using transmission fluid to generate compressed air is that engine torque output may not be directly affected. By smoothing the engine load through the transmission, the disturbance on the engine may be significantly damped, and the engine output may not be prone to rapid fluctuations. As such, utility of a vehicle may be enhanced and customer satisfaction may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
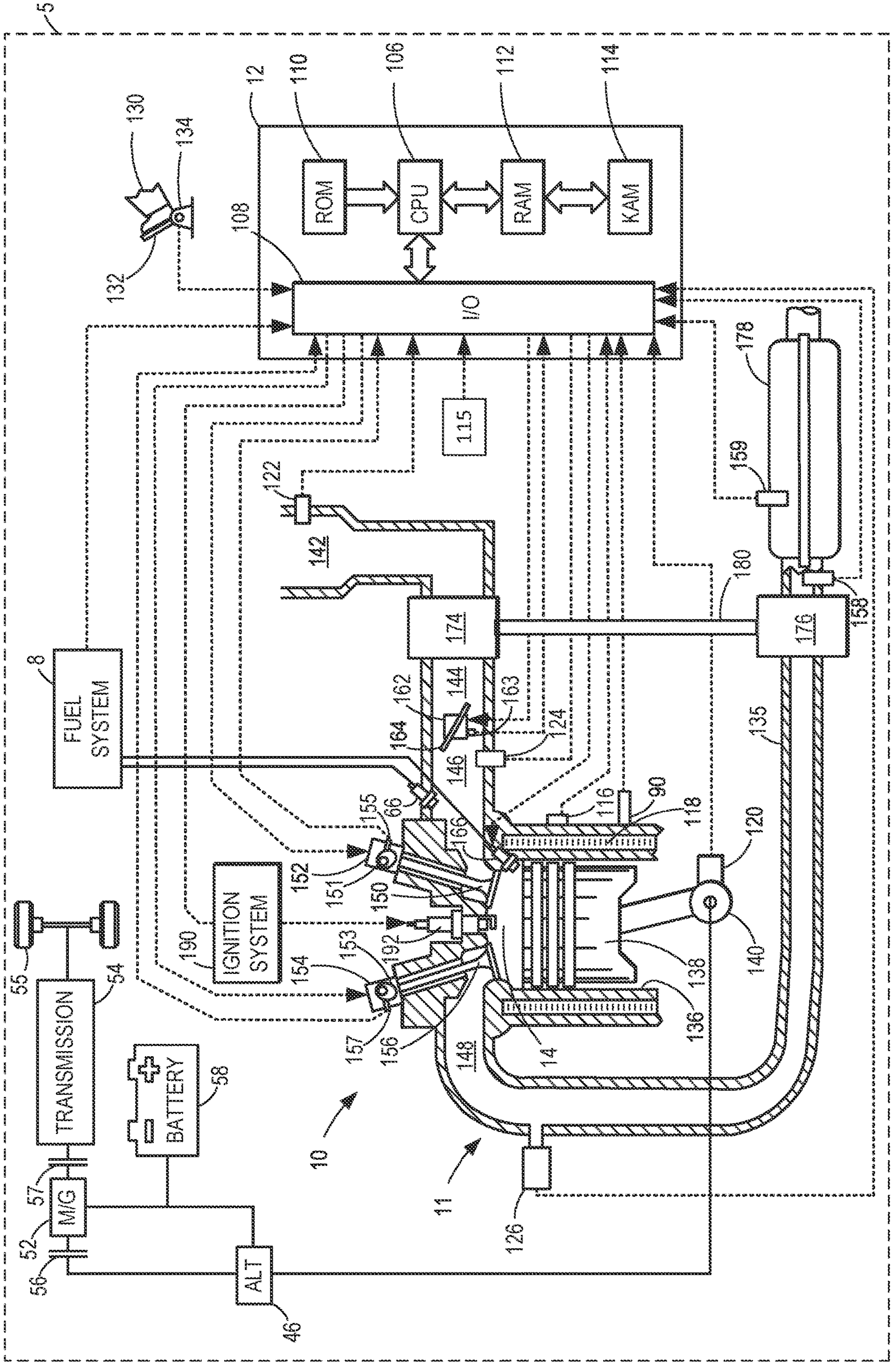
FIG. 1 shows a schematic depiction of an engine system of a vehicle.
Figure 2:
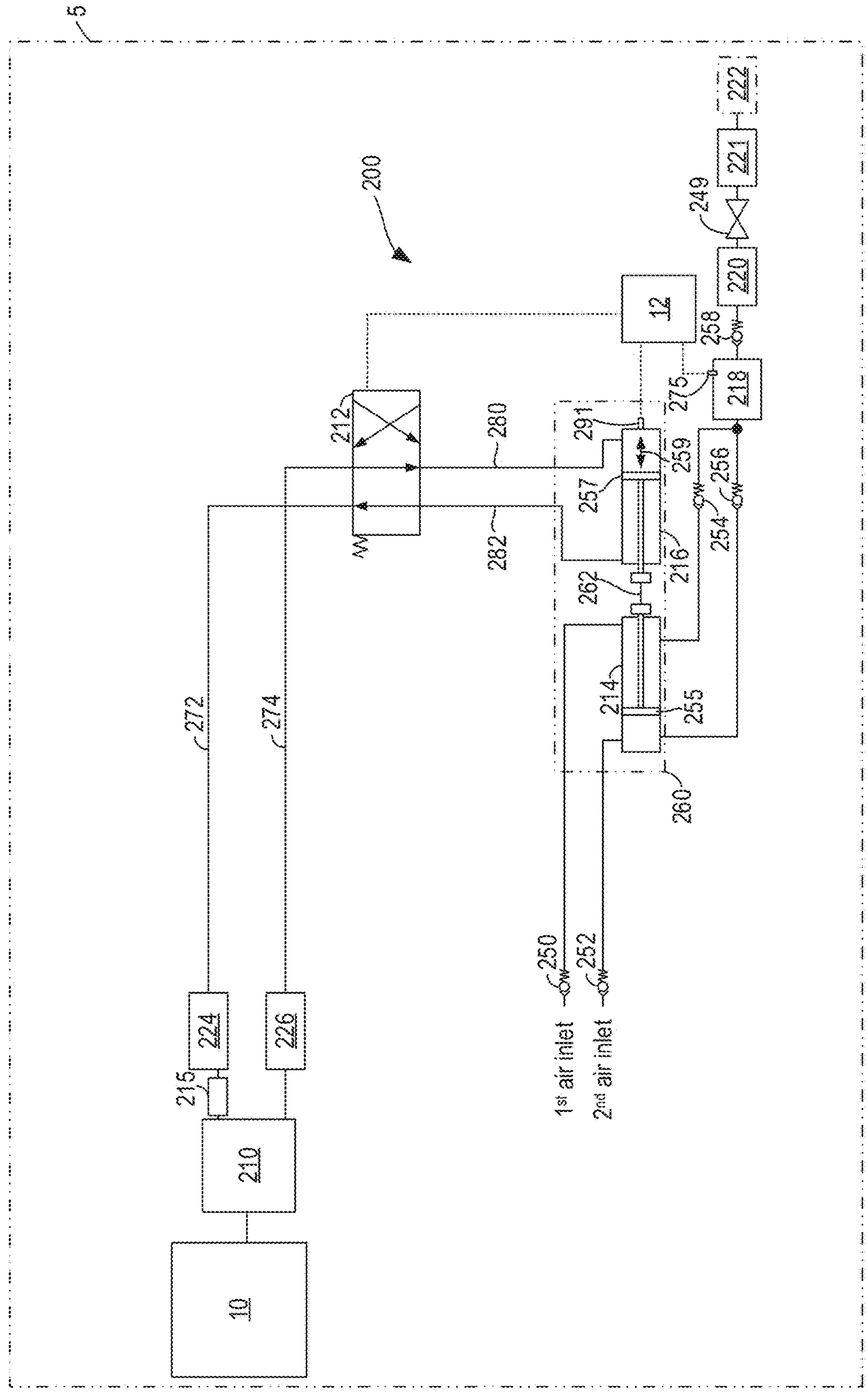
FIG. 2 shows an example transmission pump powered air compression system.

The following description relates to systems and methods for generating compressed air for powering devices that consume compressed air. The compressed air may be generated using energy from a transmission pump operated by the engine. In particular, the transmission fluid from the transmission pump may be used to operate an air compression system including two connected cylinders. A cylinder may pressurize air and the pressurized air may be stored in a tank. The air compression system may be included in a vehicle as shown in FIG. 1. The air compression system may be coupled to a transmission pump as shown in FIG. 2. The air compression system may be operated according to the method of FIGS. 3A-3B for converting energy from transmission fluid into compressed air. An example operation of the air compression system for compressed air generation is shown in FIG. 4.

Turning now to the figures, FIG. 1 depicts an example of a cylinder 14 of an internal combustion engine 10, which may be included in a vehicle 5. Engine 10 may be a variable displacement engine (VDE), as described further below. Engine 10 may be controlled at least partially by a control system, including a controller 12, and by input from a human vehicle operator 130 via a driver demand pedal 132. In this example, driver demand pedal 132 includes a pedal position sensor 134 for generating a proportional pedal position signal. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 of vehicle 5 via a transmission 54, as further described below.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 57 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The transmission 54 may include a transmission pump powered by engine power and/or motor power. The transmission pump may be configured to flow transmission fluid through components of the transmission for lubrication and cooling. As further elaborated in FIG. 2, the transmission pump may be used to operate an air compression system.

Engine 10 may be rotated via electric machine 52 during starting or when engine 10 is operated as an air pump. Alternatively, a starter motor (not shown) may rotate engine 10 during starting or when engine 10 is operated as an air pump. The starter motor may engage crankshaft 140 via a flywheel (not shown).

The powertrain may be configured in various manners, including as a parallel, a series, or a series-parallel hybrid vehicle. Further, engine 10 and electric machine 52 may be coupled via a gear set instead of a clutch in some configurations. In electric vehicle examples, a system battery 58 may be a traction battery that delivers electrical power to electric machine 52 to provide torque to vehicle wheels 55. In some examples, electric machine 52 may also be operated as a generator to provide electrical power to charge system battery 58, for example, during a braking operation. It will be appreciated that in other examples, including non-electric vehicle examples, system battery 58 may be a typical starting, lighting, ignition (SLI) battery coupled to an alternator 46.

Alternator 46 may be configured to charge system battery 58 using engine torque via crankshaft 140 during engine running. In addition, alternator 46 may power one or more electrical systems of the engine, such as one or more auxiliary systems including a heating, ventilation, and air conditioning (HVAC) system, vehicle lights, an on-board entertainment system, and other auxiliary systems based on their corresponding electrical demands. In one example, a current drawn on the alternator may continually vary based on each of an operator cabin cooling demand, a battery charging requirement, other auxiliary vehicle system demands, and motor torque. A voltage regulator may be coupled to alternator 46 in order to regulate the power output of the alternator based upon system usage requirements, including auxiliary system demands.

Cylinder 14 of engine 10 can receive intake air via a series of intake passages 142 and 144 and an intake manifold 146. Intake manifold 146 can communicate with other cylinders of engine 10 in addition to cylinder 14. One or more of the intake passages may include one or more boosting devices, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted. In still other examples, engine 10 may be provided with an electric supercharger (e.g., an "eBooster"), and compressor 174 may be driven by an electric motor. In still other examples, engine 10 may not be provided with a boosting device, such as when engine 10 is a naturally aspirated engine.

A throttle 162 including a throttle plate 164 may be provided in the engine intake passages for varying a flow rate and/or pressure of intake air provided to the engine cylinders. For example, throttle 162 may be positioned downstream of compressor 174, as shown in FIG. 1, or may be alternatively provided upstream of compressor 174. A position of throttle 162 may be communicated to controller 12 via a signal from a throttle position sensor.

An exhaust manifold 148 can receive exhaust gases from other cylinders of engine 10 in addition to cylinder 14. An exhaust gas sensor 126 is shown coupled to exhaust manifold 148 upstream of an emission control device 178. Exhaust gas sensor 126 may be selected from among various suitable sensors for providing an indication of an exhaust gas air/fuel ratio (AFR), such as a linear oxygen sensor or UEGO (universal or wide-range exhaust gas oxygen), a two-state oxygen sensor or EGO, a HEGO (heated EGO), a NOx, a HC, or a CO sensor, for example. In the example of FIG. 1, exhaust gas sensor 126 is a UEGO sensor. Emission control device 178 may be a three-way catalyst, a NOx trap, various other emission control devices, or combinations thereof. In the example of FIG. 1, emission control device 178 may be a three-way catalyst or an oxidation catalyst. Exhaust manifold 148, emissions control device 178, exhaust gas sensor 126, and temperature sensors may be included in engine exhaust system 11.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. In this example, intake valve 150 may be controlled by controller 12 by cam actuation via cam actuation system 152, including one or more cams 151. Similarly, exhaust valve 156 may be controlled by controller 12 via cam actuation system 154, including one or more cams 153. The position of intake valve 150 and exhaust valve 156 may be determined by valve position sensors (not shown) and/or camshaft position sensors 155 and 157, respectively.

During some conditions, controller 12 may vary the signals provided to cam actuation systems 152 and 154 to control the opening and closing of the respective intake and exhaust valves. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of variable displacement engine (VDE), cam profile switching (CPS), variable cam timing (VCT), variable valve timing (VVT), and/or variable valve lift (VVL) systems that may be operated by controller 12 to vary valve operation. In alternative examples, intake valve 150 and/or exhaust valve 156 may be controlled by electric valve actuation. For example, cylinder 14 may alternatively include an intake valve controlled via electric valve actuation and an exhaust valve controlled via cam actuation, including CPS and/or VCT systems. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 22:1, depending on whether engine 10 is configured as a gasoline or diesel engine. The compression ratio may also be increased if direct injection is used due to its effect on engine knock.

Each cylinder of engine 10 may include a spark plug 192 for initiating combustion when the engine is configured to combust gasoline or petrol. However, spark plug 192 may be omitted when engine 10 is configured to combust diesel fuel. An ignition system 190 can provide an ignition spark to combustion chamber 14 via spark plug 192 in response to a spark advance signal from controller 12, under select operating modes. Spark timing may be adjusted based on engine operating conditions and driver torque demand. For example, spark may be provided at minimum spark advance for best torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples, spark may be retarded from MBT, such as to expedite catalyst warm-up during engine start or to reduce an occurrence of engine knock.

In some examples, each cylinder of engine 10 may be configured with one or more fuel injectors for providing fuel thereto. As a non-limiting example, cylinder 14 is shown including a direct fuel injector 166 and a port fuel injector 66. Fuel injectors 166 and 66 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to a pulse width of a signal received from controller 12. Port fuel injector 66 may be controlled by controller 12 in a similar way. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injectors 166 and 66 from a fuel tank of fuel system 8 via fuel pumps and fuel rails. Further, the fuel tank may have a pressure transducer providing a signal to controller 12.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; a catalyst inlet temperature from a temperature sensor 158 coupled to exhaust passage 135; a catalyst temperature from temperature sensor 159; a crankshaft position signal from a Hall effect sensor 120 (or other type) coupled to crankshaft 140; throttle position from a throttle position sensor 163; signal UEGO from exhaust gas sensor 126, which may be used by controller 12 to determine the air-fuel ratio of the exhaust gas; engine vibrations via sensor 90; and an absolute manifold pressure signal (MAP) from a MAP sensor 124. An engine speed signal, RPM, may be generated by controller 12 from crankshaft position. The manifold pressure signal MAP from MAP sensor 124 may be used to provide an indication of vacuum or pressure in the intake manifold. Controller 12 may infer an engine temperature based on the engine coolant temperature.

Controller 12 receives signals from the various sensors of FIG. 1 and employs the various actuators of FIG. 1 to adjust engine operation based on the received signals and instructions stored on a memory of the controller. For example, the controller may receive input from and provide data to human/machine interface 115. In one example, human/machine interface 115 may be a touch screen device, a display and keyboard, a phone, or other known device.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Referring now to FIG. 2, a detailed view of an air compression system 200 for a vehicle is shown. The air compression system 200 may be housed in a underhood compartment or in a body of the vehicle (not a bed of the vehicle). Devices and mechanical connections (e.g., conduits or passages) are shown as solid lines and electrical connections are shown as dotted lines. In this example, engine 10 is configured with two cylinder banks (e.g., a V6 or a V8).

Controller 12 may activate air compression system 200 via actuating a transmission pump 210, if the transmission pump 210 was already not active and actuating a control valve 212. The transmission pump 210 may be powered by the engine 10. The transmission pump is configured to pump pressurized hydraulic transmission fluid throughout the transmission system. The transmission pump 210 may be coupled to a transmission fluid outlet 226 and a transmission fluid return port 224. The transmission fluid outlet port 226 may be coupled to the control valve 212 via a first fluid line 274 and the transmission fluid return port 224 may be coupled to the control valve 212 via a second fluid line 272.

The control valve 212 may be connected to an air pump 260, the air pump including a first hydraulic cylinder 216 and a second pneumatic cylinder 214. A first piston 257 within the first cylinder 216 may be connected to a second piston 255 within the second cylinder 214 via a shaft 262.

Upon actuating the control valve 212 to a first position, transmission fluid from the outlet port 226 may flow to a first side of the first cylinder 216 via the first fluid line 274 and a third fluid line 280. Upon actuating the control valve 212 to a second position, transmission fluid from the outlet port 226 may flow to a second side of the first cylinder 216 via the first fluid line 274 and a fourth fluid line 282 as transmission fluid from the first side of the first cylinder 216 is returned to the return port 224 via the third and second fluid lines 280, 272. Similarly, as the control valve 212 is again actuated to the first position, transmission fluid from the outlet port 226 may flow to the first side of the first cylinder 216 while transmission fluid from the second side of the first cylinder 216 is returned to the return port 224. Transmission fluid flows into and out of first cylinder 216 in an alternating fashion via fluid lines 280 and 282. In this way, transmission fluid may be circulated between the transmission pump and the first cylinder 216.

Cycling delivery of transmission between the two sides of cylinder 216 via cycling the position of pump control valve 212 (between the first position and the second position) may cause the first piston 257 to cycle back and forth as indicated by arrow 259. The first piston 257 is cycled via transmission fluid, and cycling the first piston 257 causes the second piston 255 to cycle in the second cylinder 214 so as to compress air that may enter the second cylinder through the $1^{st}$ air inlet or the $2^{nd}$ air inlet. As the second piston 255 cycles within the second cylinder, ambient air in alternatively drawn in via the $1^{st}$ air inlet and the $2^{nd}$ air inlet and compressed.

Only transmission fluid may enter first cylinder 216 while only air may enter cylinder 214. In this way, transmission fluid may be isolated from air that enters air pump 260. Check valves 250 and 252 permit air to enter air pump 260 and prevent air from exiting air pump 260. Pressurized air may be delivered to tank 218 from second cylinder 214 via check valves 254 and 256. Check valves 254 and 256 prevent air from flowing back to the second cylinder 214. Controller 12 may cycle pump control valve 212 in response to pressure in tank 218 as observed via pressure sensor 275. Air may flow to air power consumer 222 via pressure regulator 220 and coupling 221. The air power consumer 222 may be nail guns, staplers, paint sprayers, chippers, air hammers etc. The compressed air may also be used to inflate tires of the vehicle. Check valve 258 prevents air from flowing into tank 218 from coupling 221.

As the transmission fluid is circulated through the first cylinder 216, the temperature of the fluid may increase. The transmission fluid may be routed via a heat exchanger 215 to release some of the heat to a coolant circulating through the heat exchanger 215. In one example, the heat exchanger 215 may be positioned in the second fluid line 272. In another example, the heat exchanger 215 may be positioned within the transmission system such that the transmission fluid upon being circulated through the transmission system may be cooled at the heat exchanger. The heat exchanger 215 may be housed in a bypass passage including a bypass valve such that the transmission fluid may be selectively routed through the heat exchanger for cooling. In response to the temperature of the transmission fluid increasing to above a threshold temperature as measured by temperature sensor 291, or at the end of operation of the air compression system, the fluid may be circulated through the heat exchanger 215 and/or the entire transmission system to facilitate cooling of the transmission fluid. As the transmission fluid is circulated through the transmission system, the fluid may flow through a transmission fluid sump wherein upon mixing with cooler fluid, the temperature of the transmission fluid may reduce.

The pressure in the tank 218 may be monitored via a pressure sensor 275 coupled to the tank 218. The compressed air may be stored at the tank or directly delivered to the air power consumer 222. The pressure regulator 220 ensures a transmission of compressed air to the air power consumer at a desired pressure. A tool trigger valve 249 may be positioned between the pressure regulator 220 and the air power consumer 222 to selectively enable/disable flow of compressed air from the tank 218 to the air power consumer 222. Flowing air through to the air power consumer 222 via the tank 218 may reduce pressure pulsations reaching the tool.

In response to a demand for compressed air, transmission fluid from the transmission pump 210 may be supplied to drive the air compression system 200, and provide compressed air to one or more air consumers (tools) external to the engine. Supplying transmission fluid to drive the air compression system may include cycling a position of the control valve 212 between a first position fluidically coupling a first side of the first cylinder 216 to a transmission fluid outlet 226 of the transmission pump 210, and a second position fluidically coupling a second side of the first cylinder 216 to the transmission fluid outlet of the transmission pump. In the first position of the control valve 212, the second side of the first cylinder 216 may be fluidically coupled to a return port 224 of the transmission pump 210, and wherein in the second position of the control valve, the first side of the first cylinder 216 may be fluidically coupled to the return port of the transmission pump. Cycling the control valve 212 causes transmission fluid to be supplied and removed alternately to and from each of the first side and the second side of the first cylinder 216. As the first piston 257 oscillates within the first cylinder during the cycling of the control valve, the first piston drives the second piston 255 to oscillate within the second cylinder 214. During oscillation of the second cylinder 214, ambient air may be drawn in to the second cylinder via two air inlets and the ambient air may be compressed at the second cylinder. The generation of compressed air may be carried out in response to a pressure of compressed air stored in the air tank 218 being lower than a first threshold pressure during a request for compressed air at the one or more air consumers. The compressed air may be continued to be directed from the second cylinder to the tank until the pressure in the tank 218 increases to a second threshold pressure, the second threshold pressure higher than the first threshold pressure. In response to the pressure of compressed air stored in the tank increasing to the second threshold pressure, cycling of the control valve may be suspended to suspend flow of the transmission fluid from the transmission pump to the air compression system.

In this way, the components described in FIGS. 1-2 enable a system for a vehicle, comprising: a transmission pump coupled to a transmission fluid outlet port and a return port, a control valve coupling each of the transmission fluid outlet port and the return port to a first cylinder of an air compression system, a second cylinder including a second piston coupled to a first piston housed within the first cylinder, an air tank configured to receive and store compressed air from the second cylinder, and an external tool coupled to the air tank via a tool trigger valve, the external tool operable using compressed air from the air tank. Further, a controller may include executable instructions stored in non-transitory memory to: cycle the control valve between a first position and a second position to oscillate the first piston within the first cylinder and the second piston within the second cylinder. Cycling of the second piston may draw in air to the second cylinder alternately via two air inlets, compress the air in the second cylinder, and supply the compressed air to the air tank or the external tool.

Figure 3A:
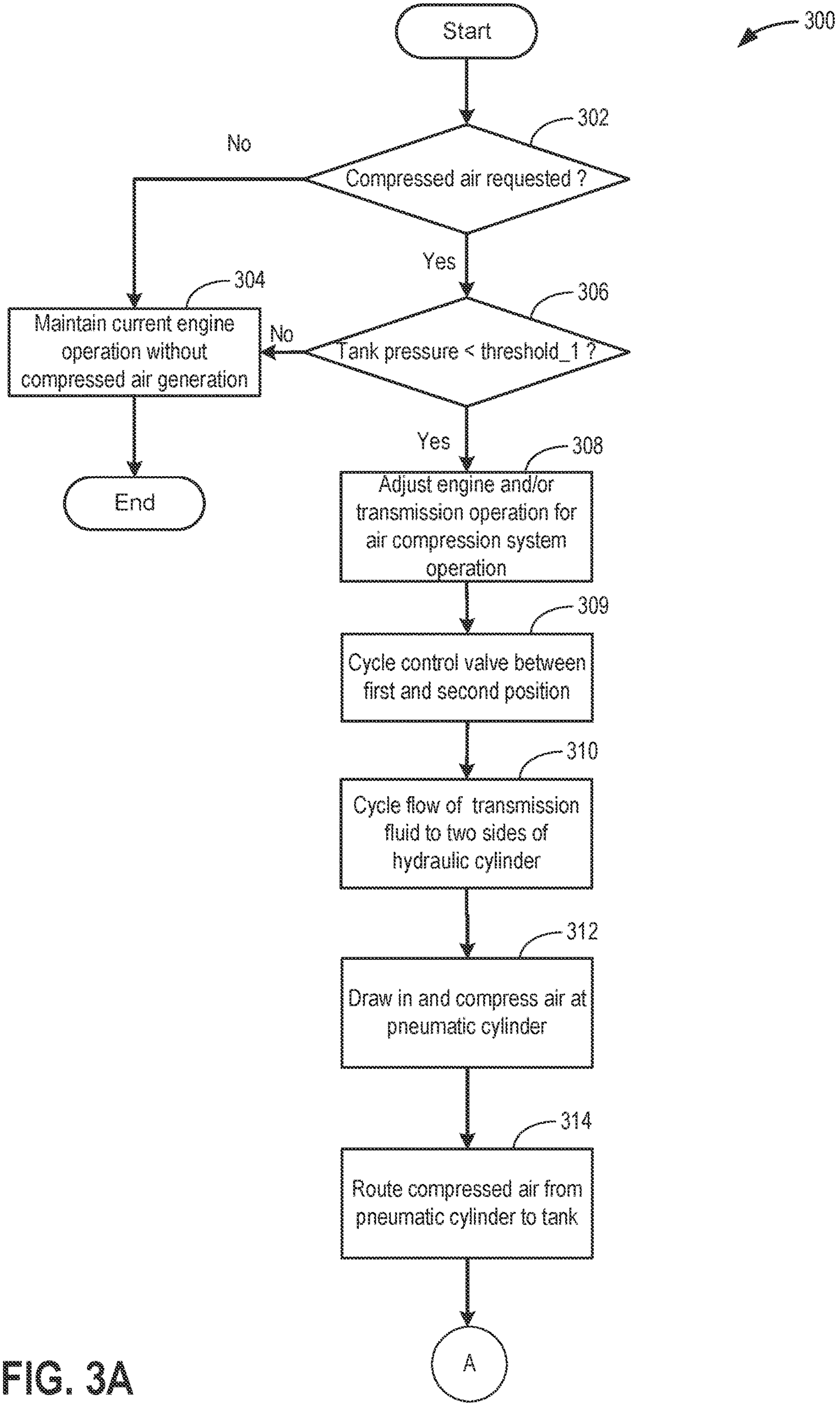
FIGS. 3A and 3B show a flowchart of an example method for operating a transmission pump powered air compression system.
Figure 3B:
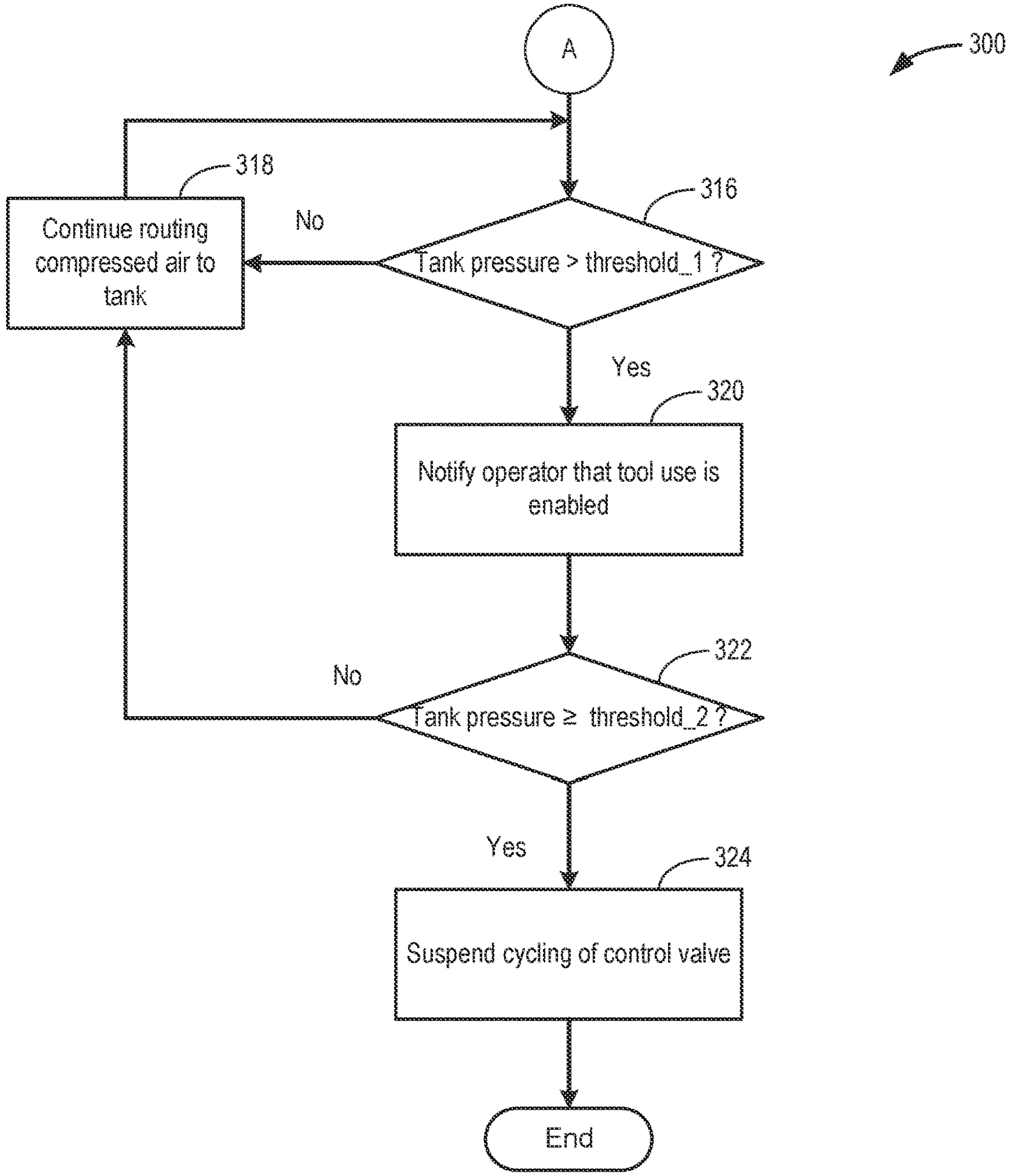
Figure 4:
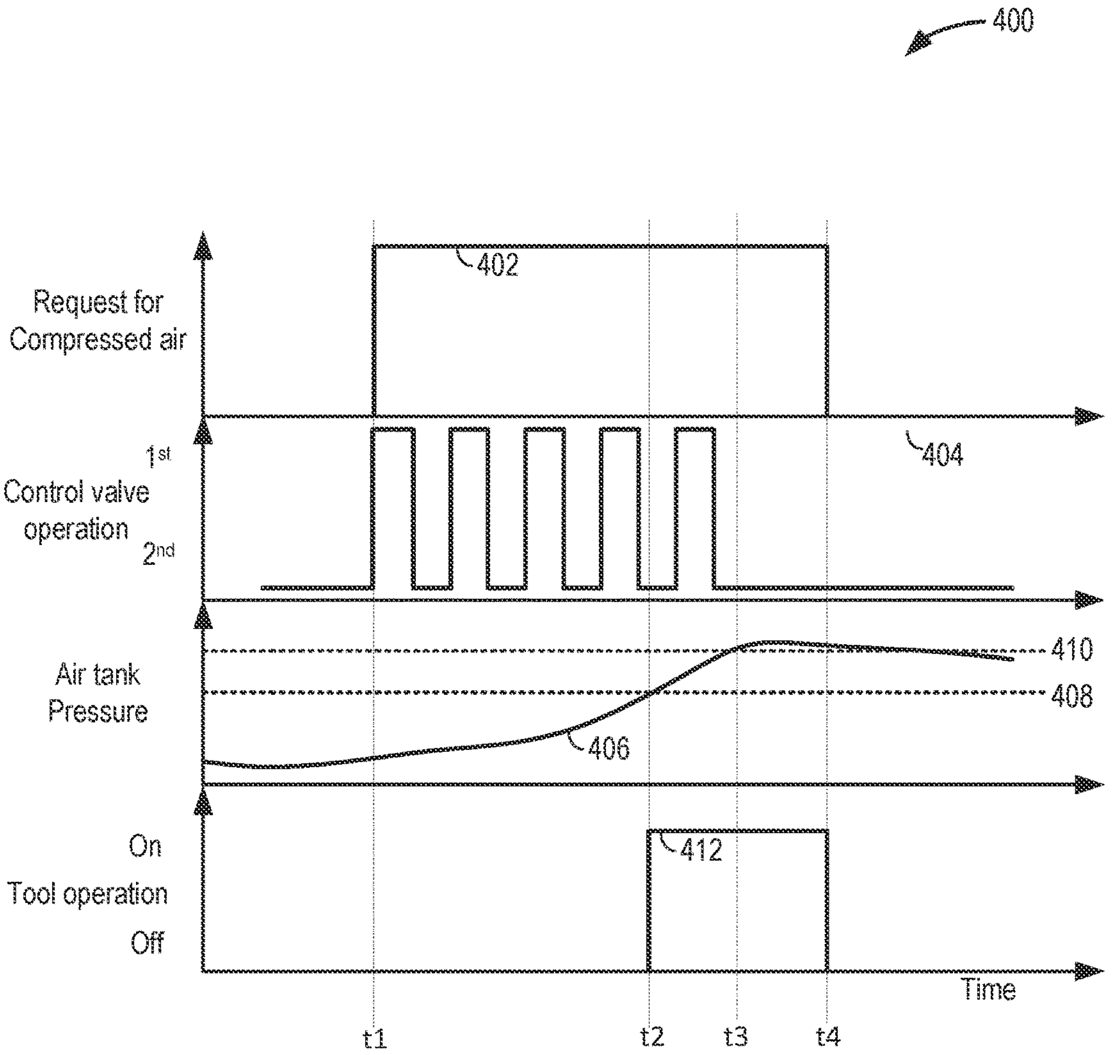
FIG. 4 shows an operating sequence for the transmission pump powered air compression system.

Referring now to FIGS. 3A and 3B, a method 300 for generating compressed air using energy from a transmission pump in a vehicle is shown. Method 300 may be included in and may cooperate with the system of FIGS. 1 and 2. Instructions for carrying out method 300 and other methods included herein may be executed by a controller (e.g. controller 12 of FIG. 2) based on instructions stored in a non-transitory memory of the controller and in conjunction with signals received from sensors of the engine system, such as the sensors described above with reference to FIGS. 1-2. The controller may employ engine actuators of the engine system to adjust engine operation, according to the methods described below. Method 300 will be described with regards to the systems described herein and depicted in FIGS. 1-2, but it should be understood that similar methods may be applied to other systems without departing from the scope of this disclosure.

At 302, method 300 determines if compressed air is requested from the vehicle. Compressed air may be requested by the operator via a human/machine interface (such as in the vehicle dashboard or via a mobile device communicatively connected to the vehicle). The compressed air may be desired for operating a tool or inflating tires of the vehicle. If it is determined that a request for compressed air supply is not being made, at 304, current engine operation may be continued without generation of compressed air. An air compression system (such as air compression system 200 in FIG. 2) including a first cylinder (such as first cylinder 216 in FIG. 2) and a second cylinder (such as second cylinder 214 in FIG. 2, also referred as the pneumatic cylinder) may be maintained inactive. During conditions when the engine power is not being used to operate the transmission pump for air compression system operation, the engine idling speed may be different from the engine idling speed during operation of the air compression system. As an example, a first idling speed of the engine during operation of the engine without air compression system operation may be higher than a second idling speed of the engine during operation of the engine with air compression system operation.

If it is determined that a request for compressed air supply is being made, at 306, the routine includes determining if an air pressure in an air tank (such as tank 218 in FIG. 2) is lower than a first threshold pressure (threshold_1). The first threshold pressure may be pre-calibrated as the air pressure needed to operate a tool. In one example, even if compressed air is not requested, the controller may periodically check if the pressure in the air tank is lower than the first threshold pressure.

If it is determined that the pressure in the air tank is higher than the first threshold pressure, it may be inferred that there is sufficient compressed air available in the tank to operate meet the requested compressed air demand and generation of compressed air may not be initiated at this time. The routine may proceed to step 304 to maintain current engine operation without compressed air generation. The controller may actuate a tool trigger valve (such as valve 249 in FIG. 2) housed in a line connecting the air tank to the tool to an open position to allow flow of compressed air to the tool based on demand.

If it is determined that the pressure in the air tank is lower than the first threshold pressure, it may be inferred that further generation of compressed air may be desired for operation of the tool. At 308, engine and/or transmission system operation may be adjusted for operating the air compression system. In order to operate the air compression system, the engine may be operated while the vehicle is stationary. In one example, during operation of the transmission pump to drive the air compression system, since engine power is used to drive the transmission pump, the idling speed of the engine may be increased from a first idling speed to a second idling speed. In another example, operation of the gear system may be limited such as a shift of a gear to drive (from park) may be disabled when using the transmission to drive the compressor.

During operation of the transmission system, a temperature of the transmission fluid and a pressure of the transmission fluid may be monitored such as via a temperature sensor and a pressure sensor, respectively. In response to the temperature of the transmission fluid increasing to above a threshold temperature and/or the pressure of the transmission fluid increasing to above a threshold pressure, operation of the transmission pump may be adjusted. The threshold temperature and the threshold pressure may be pre-calibrated based on characteristics of the transmission fluid such as viscosity and boiling point. Adjustments to the transmission pump at elevated transmission fluid temperature may include reducing a pressure of the transmission fluid routed from the transmission pump to the air compression system such as by reducing a speed of operation of the transmission pump. Also, the temperature of the transmission fluid increasing to above a threshold temperature, the transmission fluid may be circulated through the transmission system and/or a heat exchanger to dissipate the heat.

In order to operate the air compression system, at 309, a control valve (such as control valve 212 in FIG. 2) may be cycled between a first and a second position. The control valve may connect each of a transmission fluid outlet port and a transmission fluid return port to the first cylinder of the air compression system. In the first position of the control valve, transmission fluid from the outlet port may flow to a first side of the first cylinder via a first fluid line (such as first fluid line 274 in FIG. 2) and a third fluid line (such as third fluid line 280 in FIG. 2). In the second position of the control valve, transmission fluid from the outlet port may flow to a second side of the first cylinder via the first fluid line and a fourth fluid line (such as fourth fluid line 282 in FIG. 2) as transmission fluid from the first side of the first cylinder is returned to the return port via the third fluid line and a second fluid line (such as second fluid line 272 in FIG. 2). In one example, the control valve may be held at each of the first position and the second position for a threshold duration before it is actuated to the other position. The threshold duration may be in a range of 1-10 seconds.

As the control valve is cycled between the first and second position, at 310, the transmission fluid may be cycled between two sides of the first, hydraulic cylinder. The fluid may be routed alternately to and from a first and second side of the first cylinder. As an example, when the fluid reaches the first side, a first piston within the first cylinder is pushed towards the second side and the fluid from the second side may be returned to the transmission pump. Similarly, when the fluid reaches the second side, a first piston (such as first piston 257 in FIG. 2) within the first cylinder is pushed towards the first side and the fluid from the second side may be returned to the transmission pump. As the first piston is cycled via the transmission fluid, a second piston (such as second piston 255 in FIG. 2), attached to the first piston, also cycles within the second cylinder.

At 312, ambient air may be drawn in and compressed at the second (pneumatic) cylinder. A first side of the second cylinder may be coupled to a first air inlet while a second side of the second cylinder may be coupled to a second air inlet. As the second piston cycles within the second cylinder, ambient air may be drawn in alternately via the first and the second air inlet. The cycling of the second piston causes the air to compress alternatively at the two sides of the second cylinder.

At 314, compressed air from the second (pneumatic) cylinder may be routed to the air tank. Air lines from each side of the second compressor may route the compressed air to the tank. The compressed air may be stored at the tank or delivered to the tool via the tool trigger valve. As the compressed air is stored in the tank, a pressure in the tank may increase and the change in pressure may be monitored via a pressure sensor (such as pressure sensor 275 in FIG. 2) coupled to the tank.

At 316, the routine includes determining if the pressure in the tank has increased to the first threshold pressure. If the pressure increases to above the first threshold pressure, it may be inferred that sufficient air is present in the tank for tool operation. If it is determined that the pressure in the tank has not increased to the first threshold pressure, at 318, compressed air may continue to be routed to the tank. If it is determined that the pressure in the tank has increased to the first threshold pressure, at 320, the operator may be notified that tool usage is enabled. The compressed air in the tank may be sufficient to operate the tool or inflate tires, as requested. In one example, steps 316 and 320 may be eliminated and compressed air may be routed directly from the second cylinder to the tool as the compressed air is being generated at the second cylinder.

At 322, the routine includes determining if the pressure in the tank has increased to a second threshold pressure (threshold_2). The second threshold pressure may be pre-calibrated based on the capacity of the tank. An air pressure above the second threshold pressure may cause wear in the tank and increase the possibility of leaks.

If it is determined that the tank pressure is lower than the second threshold pressure, the routine may return to step 318 to continue routing compressed air to the tank. The air compression system may be continued to be operated. If it is determined that the tank pressure has reached the second threshold pressure, it may be inferred that further generation of compressed air may not be desired. Therefore, at 324, the cycling of the control valve may be suspended. The control valve may be stopped from actuating between the first and second positions and may be held in either the first or second position. As the control valve stops cycling, the first piston and the second piston may become stationary, thereby suspending flow of ambient air to the second cylinder and the subsequent compression of that air. In this way, further generation of compressed air may be suspended. Operation of the transmission pump may be carried out based on engine and vehicle operation. In one example, during operation of the air compression system, upon the temperature of the transmission fluid increasing to above the threshold temperature and/or the pressure of the transmission fluid increasing to above the threshold pressure, the air compression system may also be deactivated.

Upon completion of operation of the air compressor system, if the temperature of the fluid is higher than the threshold temperature, the fluid may be circulated through the transmission system and/or a heat exchanger (such as heat exchanger 215 in FIG. 2) coupled to the return (second) fluid line or housed within the transmission system to enable the heated fluid to be cooled via a vehicle oil cooling system. Further still, upon completion of operation of the air compressor, if the operator drives the vehicle, a modified gear shift strategy may be utilized until the fluid has been circulated enough to cool it down (such as the temperature of the fluid reduces significantly below the threshold temperature).

In this way, in response to a request for compressed air, transmission fluid may be circulated through a first cylinder of an air compression system; and ambient air may be compressed at a second cylinder coupled to the first cylinder via a piston. The compressed air may be stored in an air tank and/or directly supplying the compressed air to a tool coupled to the vehicle.

FIG. 4 shows an example operating sequence 400 for an air compression system (such as air compression system 200 in FIG. 2) in a vehicle. The air compression system may include a first cylinder (such as first cylinder 216 in FIG. 2) with a first piston of the first cylinder connected to a second piston of a second cylinder (such as second cylinder 214 in FIG. 2). The horizontal (x-axis) denotes time and the vertical markers t0-t4 identify significant times in the compressed air generation.

The first plot, line 402, denotes a request for compressed air. The request can be made by an operator via a HMI in the dashboard or a smart device connected to the vehicle indicating the desire to use compressed air to power a tool or pump the vehicle tires. The second plot, line 404, denotes position of a control valve (such as control valve 212 in FIG. 2). In the first position, the control valve allows transmission fluid to enter a first side of the first cylinder while fluid from a second side of the first cylinder is returned to the transmission pump. In the second position, the control valve allows transmission fluid to enter the second side of the first cylinder while fluid from the first side of the first cylinder is returned to the transmission pump. The third plot, line 406, denotes a pressure of compressed air stored in a tank from where the air can be supplied to the tool as measured via a pressure sensor coupled to the tank. Dashed line 408 denotes a first threshold air pressure below which the tool cannot be effectively operated. Dashed line 410 denotes a second threshold air pressure above which compressed air cannot be stored in the tank. The fourth plot, line 412, denotes operation of the tool by the operator, the tool being powered by compressed air generated by the air compression system.

Prior to time t1, compressed air is not requested and the control valve is held stationary at the second position. Transmission fluid is not cycled through the first cylinder. The air pressure in the tank is below each of the first threshold and second threshold air pressure and the tool is not operated.

At time t1, a request for compressed air is received and in response to the air pressure in the tank being lower than the first threshold, it is inferred that the tank does not contain sufficient air for operation of the tool and compressed air generation is initiated. The control valve is oscillated between the first position and the second positon. Due to the oscillation of the control valve, the first piston inside the first cylinder oscillates and causes the second piston (within the second cylinder) coupled to the first piston to oscillate. Oscillation of the second piston draws in ambient air alternately from a first and a second air inlet and compresses the air alternately at each end of the second cylinder. Between time t1 and t2, as the compressed air is generated at the second cylinder and routed to the tank, the pressure in the tank increases. At time t2, in response to the pressure in the tank reaching the first threshold pressure 408, the operator is notified that operation of the tool can be initiated. Between time t2 and t3, compressed air generation is continued by oscillating the control valve between the first and second positions while the tool is being operated using compressed air form the tank.

At time t3, in response to the pressure in the tank reaching the second threshold pressure 410, generation of compressed air is suspended. The oscillation of the control valve is suspended and the valve is held at the last position (such as second position in this example) to suspend back and forth routing of transmission, thereby stopping operation of the air compression system. Compressed air is no longer generated at the second cylinder. Between time t3 and t4, the tool is operated by using compressed air from the tank. At time t4, the tool operation is suspended and the compressed air is no longer routed to the tool.

In this way, transmission fluid which is readily available in a vehicle may be effectively used for generating compressed air. By storing the compressed air in the tank, the air may be available for operation of tools and/or inflation of tires on demand. The technical effect of using energy from the transmission pump to drive the air compression system is that compressed air may be readily generated at the vehicle without towing a compressor or using an electric power source to drive a compressor. Overall, by providing a reliable source of compressed air, utility of a vehicle may be enhanced and customer satisfaction may be improved.

An example method for a vehicle comprises: supplying transmission fluid from a transmission pump to drive an air compression system, and providing compressed air to one or more air consumers external to an engine of the vehicle. In any of the preceding examples, additionally or optionally, the air compression system includes a first cylinder housing a first piston and a second cylinder housing a second piston, the first piston connected to the second piston. In any or all of the preceding examples, additionally or optionally, the transmission pump is coupled to the first cylinder via a control valve. In any or all of the preceding examples, additionally or optionally, supplying transmission fluid to drive the air compression system includes cycling a position of the control valve between a first position fluidically coupling a first side of the first cylinder to a transmission fluid outlet of the transmission pump, and a second position fluidically coupling a second side of the first cylinder to the transmission fluid outlet of the transmission pump. In any or all of the preceding examples, additionally or optionally, when the control valve is in the first position, the second side of the first cylinder is fluidically coupled to a return port of the transmission pump, and wherein when the control valve is in the second position, the first side of the first cylinder is fluidically coupled to the return port of the transmission pump. In any or all of the preceding examples, additionally or optionally, cycling the control valve includes supplying transmission fluid and removing transmission fluid alternately to and from each of the first side and the second side of the first cylinder. In any or all of the preceding examples, additionally or optionally, the first piston oscillates within the first cylinder during the cycling of the control valve, the first piston driving the second piston to oscillate within the second cylinder. In any or all of the preceding examples, additionally or optionally, the method further comprising, during oscillation of the second cylinder, drawing in ambient air to the second cylinder via two air inlets and compressing the ambient air at the second cylinder. In any or all of the preceding examples, additionally or optionally, providing the compressed air includes routing the compressed air from the second cylinder to an air tank and the one or more air consumers. In any or all of the preceding examples, additionally or optionally, the transmission fluid is supplied to the air compression system in response to a pressure of compressed air stored in the air tank being lower than a first threshold pressure during a request for compressed air at the one or more air consumers. Any or all of the preceding examples, further comprising, additionally or optionally, routing the compressed air from the second cylinder to the air tank until the pressure in the air tank increases to a second threshold pressure, the second threshold pressure higher than the first threshold pressure. Any or all of the preceding examples, further comprising, additionally or optionally, in response to the pressure of compressed air stored in the air tank increasing to the second threshold pressure, suspending cycling of the control valve to suspend flow of the transmission fluid from the transmission pump to the air compression system.

Another example method for a vehicle, comprises: in response to a request for compressed air, circulating transmission fluid through a first cylinder of an air compression system, and compressing ambient air at a second cylinder coupled to the first cylinder via a piston. In any of the preceding examples, additionally or optionally, the method further comprising, storing the compressed air in an air tank and/or directly supplying the compressed air to a tool coupled to the vehicle. In any or all of the preceding examples, additionally or optionally, the request for compressed air is made during an air pressure in the air tank being lower than a first threshold pressure while the request for operation of the tool is received from an operator. In any or all of the preceding examples, additionally or optionally, circulating transmission fluid through the first cylinder includes cycling a control valve coupling a transmission pump to the first cylinder between a first position and a second position. In any or all of the preceding examples, additionally or optionally, cycling the control valve oscillates the piston within the second cylinder, draws in ambient air to the second cylinder, and then compresses the ambient air within the second cylinder.

Yet another example system for a vehicle, comprises: a transmission pump coupled to a transmission fluid outlet port and a return port, a control valve coupling each of the transmission fluid outlet port and the return port to a first cylinder of an air compression system, a second cylinder including a second piston coupled to a first piston housed within the first cylinder, an air tank configured to receive and store compressed air from the second cylinder, and an external tool coupled to the air tank via a tool trigger valve, the external tool operable using compressed air from the air tank. Any or all of the preceding examples, additionally or optionally, further comprising, a controller including executable instructions stored in non-transitory memory to: cycle the control valve between a first position and a second position to oscillate the first piston within the first cylinder and the second piston within the second cylinder. In any or all of the preceding examples, additionally or optionally, the controller includes further instructions to: draw in air to the second cylinder alternately via two air inlets, compress the air in the second cylinder, and supply the compressed air to the air tank or the external tool.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. Additionally, it should be appreciated that the valves described herein may be replaced with differently configured valves that provide similar functionality without departing from the scope of this disclosure.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, the method comprising:

supplying transmission fluid from a transmission pump of a transmission system to drive an air compression system and to lubricate hydraulically actuated components of a transmission of the transmission system, wherein the transmission pump is configured to be driven by an engine of the vehicle, and providing compressed air from the air compression system to one or more air consumers external to the engine of the vehicle via a pressure regulator, wherein the air compression system includes a first cylinder and a second cylinder, wherein the transmission pump is coupled to the first cylinder via a control valve, wherein supplying transmission fluid from the transmission pump to drive the air compression system includes cycling a position of the control valve between a first position fluidically coupling a first side of the first cylinder to a transmission fluid outlet of the transmission pump, and a second position fluidically coupling a second side of the first cylinder to the transmission fluid outlet of the transmission pump, wherein the control valve is held at the first position for a threshold duration before it is actuated to the second position, and wherein the control valve is held at the second position for the threshold duration before it is actuated to the first position, and wherein supplying transmission fluid from the transmission pump to drive the air compression system takes place when the vehicle is stationary with the transmission in park.

2. The method of claim 1, wherein the first cylinder houses a first piston and the second cylinder houses a second piston, the first piston operatively connected to the second piston.

3. The method of claim 2, wherein only transmission fluid may enter the first cylinder and only air may enter the second cylinder.

4. The method of claim 3, wherein the threshold duration is 1-10 seconds.

5. The method of claim 4, wherein when the control valve is in the first position, the second side of the first cylinder is fluidically coupled to a return port of the transmission pump, and wherein when the control valve is in the second position, the first side of the first cylinder is fluidically coupled to the return port of the transmission pump.

6. The method of claim 4, wherein cycling the control valve includes supplying transmission fluid and removing transmission fluid alternately to and from each of the first side and the second side of the first cylinder.

7. The method of claim 4, wherein the first piston oscillates within the first cylinder during the cycling of the control valve, the first piston driving the second piston to oscillate within the second cylinder.

8. The method of claim 7, further comprising, during oscillation of the second piston within the second cylinder, drawing in ambient air to the second cylinder via two air inlets and compressing the ambient air in the second cylinder, wherein drawing in the ambient air to the second cylinder via the two air inlets comprises drawing in the ambient air to a first chamber of the second cylinder from a first air inlet external to the second cylinder, and to a second chamber of the second cylinder from a second air inlet external to the second cylinder, the first chamber and the second chamber separated by the second piston.

9. The method of claim 2, wherein the transmission fluid is supplied to the air compression system in response to a pressure of compressed air stored in an air tank directly fluidically coupled to each of two chambers of the second cylinder separated from one another by the second piston being lower than a first threshold pressure during a request for compressed air at the one or more air consumers.

10. The method of claim 9, wherein providing the compressed air includes routing the compressed air from each of the two chambers of the second cylinder to the air tank and the one or more air consumers until the pressure in the air tank increases to a second threshold pressure, the second threshold pressure higher than the first threshold pressure.

11. The method of claim 10, further comprising, in response to the pressure of compressed air stored in the air tank increasing to the second threshold pressure, suspending cycling of the control valve to suspend a flow of the transmission fluid from the transmission pump to the air compression system.

12. The method of claim 1, further comprising, during supplying transmission fluid from the transmission pump to drive the air compression system, disabling a shift of a gear of the transmission from park and increasing an idling speed of the engine.

13. A method for a vehicle, the method comprising:

in response to a request for compressed air received via a human-machine interface of the vehicle, adjusting an operation of an engine of the vehicle and/or an operation of a transmission system of the vehicle, wherein the transmission system is configured to supply transmission fluid to both lubricate hydraulically actuated components of a transmission of the transmission system and drive an air compression system, wherein the operation of the engine and/or the operation of the transmission system is adjusted by:

increasing an idling speed of the engine of the vehicle from a first idling speed to a second idling speed, monitoring a temperature and pressure of the transmission fluid via respective temperature and pressure sensors coupled to a transmission fluid circuit of the transmission system, adjusting an operation of a transmission pump of the transmission system in response to the temperature of the transmission fluid increasing above a threshold temperature or the pressure of the transmission fluid increasing above a first threshold pressure by one or more of: reducing a speed of operation of the transmission pump and suspending cycling of a control valve coupling the transmission pump to a first cylinder of the air compression system, and circulating the transmission fluid through a heat exchanger disposed in the transmission fluid circuit in response to the temperature of the transmission fluid exceeding the threshold temperature;

circulating the transmission fluid through the first cylinder of the air compression system by cycling a position of the control valve between a first position and a second position, wherein the control valve is held at the first position for a threshold duration before it is actuated to the second position, and wherein the control valve is held at the second position for the threshold duration before it is actuated to the first position, wherein the threshold duration is 1-10 seconds;

compressing ambient air in a second cylinder coupled to the first cylinder via a piston within the second cylinder; and storing the compressed air in an air tank fluidically coupled directly to each of a first chamber and a second chamber of the second cylinder, the first chamber separated from the second chamber by the piston, wherein supplying transmission fluid from the transmission pump to drive the air compression system takes place when the vehicle is stationary with the transmission in park.

14. The method of claim 13, wherein the request for compressed air received via the human-machine interface of the vehicle is made when an air pressure in the air tank is lower than a second threshold pressure while a request for operation of an external tool is received from an operator.

15. The method of claim 13, wherein the heat exchanger is configured to transfer heat from the transmission fluid to one or more of ambient air or engine coolant.

16. The method of claim 15, wherein cycling the control valve oscillates the piston within the second cylinder, draws in ambient air to the second cylinder, and then compresses the ambient air within the second cylinder.

17. A system for a vehicle, the system comprising:

a transmission pump coupled to a transmission fluid outlet port and a return port, wherein the transmission pump is configured to supply transmission fluid to both lubricate hydraulically actuated components of a transmission and drive an air compression system, wherein the transmission pump is driven by an engine of the vehicle;

a heat exchanger disposed in a transmission fluid circuit, the heat exchanger configured to transfer heat from the transmission fluid to one or more of ambient air or engine coolant;

a control valve coupling each of the transmission fluid outlet port and the return port to a first cylinder of the air compression system;

a first piston housed within the first cylinder, wherein only transmission fluid may enter the first cylinder;

a second cylinder including a second piston coupled to the first piston via a shaft, wherein a first side of the second cylinder is coupled to a first air inlet external to the second cylinder and a second side of the second cylinder is coupled to a second air inlet external to the second cylinder, wherein only air may enter the second cylinder, and wherein during oscillation of the second piston within the second cylinder, ambient air is drawn in alternately via the first air inlet to a first side of the second cylinder and via the second air inlet to a second side of the second cylinder, the first side of the second cylinder separated from the second side of the second cylinder by the second piston;

a pressure sensor coupled to the transmission fluid circuit, wherein the pressure sensor measures the pressure of the transmission fluid in the transmission fluid circuit, a temperature sensor coupled to the transmission fluid circuit, wherein the temperature sensor measures the temperature of the transmission fluid in the transmission fluid circuit, an air tank configured to receive and store compressed air from each of the first side and the second side of the second cylinde; and a pressure regulator fluidically coupled between the air tank and an external tool, the external tool coupled to the air tank via the pressure regulator and a tool trigger valve, the external tool operable using compressed air from the air tank, wherein the transmission pump is configured to supply the transmission fluid to drive the air compression system when the vehicle is stationary with the transmission in park.

18. The system of claim 17, further comprising a controller including executable instructions stored in non-transitory memory to: cycle the control valve between a first position and a second position to oscillate the first piston within the first cylinder and the second piston within the second cylinder.

19. The system of claim 18, wherein the controller includes further instructions to: draw in ambient air to the first side of the second cylinder via the first air inlet external to the second cylinder and the second side of the second cylinder via the second air inlet external to the second cylinder alternately, compress the ambient air in the first side and the second side of the second cylinder, and supply the compressed air to the air tank or the external tool from the first side and the second side of the second cylinder.

* * * * *